(12) United States Patent
Matsumoto et al.

(10) Patent No.: US 8,076,017 B2
(45) Date of Patent: Dec. 13, 2011

(54) FUEL CELL STACK

(75) Inventors: Toshihiro Matsumoto, Osaka (JP);
Yoshiki Nagao, Osaka (JP); Hiroki Kusakabe, Osaka (JP); Norihiko Kawabata, Osaka (JP); Kenji Arai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/997,647

(22) PCT Filed: Mar. 5, 2010

(86) PCT No.: PCT/JP2010/001576
§ 371 (c)(1),
(2), (4) Date: Dec. 13, 2010

(87) PCT Pub. No.: WO2010/106753
PCT Pub. Date: Sep. 23, 2010

(65) Prior Publication Data
US 2011/0091786 A1  Apr. 21, 2011

(30) Foreign Application Priority Data
Mar. 17, 2009 (JP) .................................. 2009-064152

(51) Int. Cl.
*H01M 8/02* (2006.01)
*H01M 8/24* (2006.01)

(52) U.S. Cl. ........................ 429/66; 429/469; 429/470

(58) Field of Classification Search .................... 429/66, 429/469, 470
See application file for complete search history.

(56) References Cited

U.S. PATENT DOCUMENTS

| 6,428,921 | B1 * | 8/2002 | Grot ............................. 429/470 |
| 7,291,413 | B2 * | 11/2007 | Allen et al. .................... 429/470 |
| 2005/0164077 | A1 * | 7/2005 | Bacon ............................ 429/66 |
| 2005/0277012 | A1 | 12/2005 | Inagaki |
| 2008/0090122 | A1 | 4/2008 | Andreas-Schott et al. |
| 2009/0305104 | A1 | 12/2009 | Matsumoto et al. |

FOREIGN PATENT DOCUMENTS

| JP | 08-203553 | 8/1996 |
| JP | 2004-288618 | 10/2004 |
| JP | 2005-123114 | 5/2005 |
| JP | 2006-114362 | 4/2006 |

(Continued)

OTHER PUBLICATIONS

International Search Report of PCT Application No. PCT/JP2010/001576 dated Jun. 22, 2010.

*Primary Examiner* — Stephen J. Kalafut
(74) *Attorney, Agent, or Firm* — Panasonic Patent Center; Dhiren Odedra; Kerry Culpepper

(57) ABSTRACT

Disclosed is a fuel cell stack which includes: a cell assembly formed of stacked unit cells, each composed of a membrane electrolyte assembly and separators which sandwich the membrane electrolyte assembly; a pair of collector plates A and B which sandwiches the cell assembly; a pair of end plates A and B which sandwiches the cell assembly and the collector plates; and an elastic member disposed between end plate A and collector plate A, wherein end plate A has a convexed portion and a concaved portion on a surface facing collector plate A, and the concaved portion of end plate A holds therein the elastic member, and a bottom surface of the concaved portion includes a second convexed portion and a second concaved portion.

14 Claims, 17 Drawing Sheets

FOREIGN PATENT DOCUMENTS

| | | |
|---|---|---|
| JP | 2006-172856 | 6/2006 |
| JP | 2006-179220 | 7/2006 |
| JP | 2007-257865 | 10/2007 |
| JP | 2008-060011 | 3/2008 |
| JP | 2008-234919 | 10/2008 |
| JP | 2008-293996 | 12/2008 |
| JP | 2009-187778 | 8/2009 |
| JP | 2009-277521 | 11/2009 |
| WO | 2008/089977 | 7/2008 |
| WO | 2008/149554 | 12/2008 |

\* cited by examiner

FUEL CELL STACK

TECHNICAL FIELD

The present invention relates to fuel cell stacks.

BACKGROUND ART

A fuel cell stack is a stack of fuel cells (unit cells), each consisting of a membrane electrode assembly (hereinafter also referred to as "MEA") and a pair of separators sandwiching the MEA. The MEA includes a polymer electrolyte membrane and a pair of catalyst electrodes which sandwiches the polymer electrolyte membrane.

The polymer electrolyte membrane is composed of an electrolyte which contains a polymer ion-exchange membrane or the like, such as a sulfonic acid group-containing fluorine resin ion-exchange membrane or hydrocarbon resin ion-exchange membrane.

The catalyst electrode is composed of a catalyst layer that promotes a redox reaction therein and of a gas diffusion layer having both air permeability and electric conductivity. The catalyst layer is in contact with the polymer electrolyte membrane. The gas diffusion layer is composed of a carbon coat layer for improving adhesion to the catalyst layer and of a gas diffusion base layer through which a gas supplied from an external source is allowed to diffuse to the catalyst layer. The catalyst layer for the fuel electrode contains, for example, platinum or platinum-ruthenium alloy, and the catalyst layer for the air electrode contains, for example, platinum or platinum-cobalt alloy.

The separator is a conductive member for avoiding mixing of a fuel gas to be supplied to the fuel and an oxidizing gas to be supplied to the air electrode.

In a fuel cell stack, unit cells can be electrically connected in series by stacking them on top of each other. Such a fuel cell stack further includes end plates for sandwiching the cell assembly (see, e.g., Patent Documents 1 and 2). In some cases, in order to apply a uniform load to the cell assembly, a spring module (see, e.g., Patent Documents 3 and 4) or an elastic member (see, e.g., Patent Documents 5 and 6) is disposed between the cell assembly and the end plate.

FIG. 1 is a cross-sectional view of fuel cell stack 1 described in Patent Document 6. As illustrated in FIG. 1, fuel cell stack 1 disclosed by Patent Document 6 includes cell assembly 12, pressure plates 2 and 8 which sandwich cell assembly 12, and end plate 20. Elastic members 19 are disposed between end plate 20 and pressure plate 2.

The pressure plates are made electrically conductive on their surface which faces cell assembly 12, with the other surfaces being made insulating. Elastic members 19 are each held by concaved portion 9 formed in end plate 20 and by concaved portion 7 formed in collector plate 2.

Electric energy can be extracted by supplying a fuel gas (hydrogen is contained) and an oxidizing gas (oxygen is contained) to the respective unit cells of a fuel cell stack configured as described above. The following describes chemical reactions that occur by supplying a fuel gas and an oxidizing gas to the unit cells.

Hydrogen molecules supplied to the fuel electrode are split into hydrogen ions and electrons in the catalyst layer. The hydrogen ions migrate through the humidified polymer electrolyte membrane to the air electrode side. On the other hand, the electrons migrate through an external circuit to the air electrode to which oxidizing gas is supplied. The electrons migrating through the external circuit can be utilized as electric energy. In the catalyst layer of the air electrode, hydrogen ions from the polymer electrolyte membrane, electrons from the external circuit, and oxygen supplied to the air electrode are reacted together to form water. In addition, heat is generated during the reaction.

By supplying a fuel gas and an oxidizing gas to fuel cells in this way, it is possible to obtain electric energy and thermal energy at the same time. This allows fuel cell stacks to be used as a household co-generation system that requires both power generation and hot-water supply (see, e.g., Patent Document 7). In household co-generation systems, heat generated during power generation is recovered using a coolant that is caused to flow through channels formed in the separators. The recovered heat is stored in a hot-water storage tank for subsequent utilization as thermal energy.

In addition, technologies are known in which the cell assembly-side surface of end plates are concaved or convexed for the purpose of facilitating temperature adjustment of the fuel cell stack during operation (see, e.g., Patent Document 8).

[Patent Document 1] Japanese Patent Application Laid-Open No. 2005-123114
[Patent Document 2] Japanese Patent Application Laid-Open No. 08-203553
[Patent Document 3] Japanese Patent Application Laid-Open No. 2004-288618
[Patent Document 4] U.S. Patent Application Publication No. 2005/0277012
[Patent Document 5] Japanese Patent Application Laid-Open No. 2007-257865
[Patent Document 6] Japanese Patent Application Laid-Open No. 2006-179220
[Patent Document 7] Japanese Patent Application Laid-Open No. 2008-293996
[Patent Document 8] U.S. Patent Application Publication No. 2008/0090122

DISCLOSURE OF INVENTION

Problems to be Solved by the Invention

In conventional fuel cell stacks, however, some heat generated during power generation is conducted to the end plates from the cell assembly rather than being recovered by a coolant. The heat conducted to the end plates cannot be recovered as it radiates to the outside from the end plates. Thus, the conventional fuel cell stacks have the disadvantage of being unable to efficiently recover heat generated during power generation for utilization as thermal energy.

For example, in fuel cell stack 1 of Patent Document 6 illustrated in FIG. 1, heat of cell assembly 12 generated during power generation is conducted to pressure plate 8 and radiates to the outside. Moreover, heat generated in cell assembly 12 passes through pressure plate 2 and elastic member 19 to end plate 20 to dissipate to the outside.

It is therefore an object of the present invention to provide a fuel cell stack from which heat generated during power generation can be efficiently recovered, by reducing heat loss from end plates.

Means for Solving the Problem

The inventors have established that heat loss can be suppressed by reducing the contact area between an end plate and a collector plate as well as the contact area between the end plate and elastic members. With additional studies, the inventors have completed the invention. Specifically, the present invention relates to fuel cell stacks given below.

[1] A fuel cell stack including:
a cell assembly which is formed of a stacked unit cells, each composed of a membrane electrolyte assembly and separators which sandwich the membrane electrolyte assembly;
   a pair of collector plates A and B which sandwiches the cell assembly;
   a pair of end plates A and B which sandwiches the cell assembly and the collector plates; and
   an elastic member disposed between end plate A and collector plate A,
wherein end plate A has a convexed portion and a concaved portion on a surface facing collector plate A, and
the concaved portion of end plate A holds therein the elastic member, and a bottom surface of the concaved portion includes a second convexed portion and a second concaved portion.

[2] The fuel cell stack according to [1] above, wherein the elastic member contacts a top surface of the second convexed portion.

[3] The fuel cell stack according to [1] or [2] above, wherein collector plate A includes a concaved portion for holding therein the elastic member, a bottom surface of the concaved portion of collector plate A includes a third convexed portion and a third concaved portion, and the elastic member contacts a top surface of the third convexed portion.

[4] The fuel cell stack according to any one of [1] to [3] above, wherein the elastic member is a coil spring.

[5] The fuel cell stack according to any one of [1] to [4] above, wherein end plate B includes a convexed portion and a concaved portion on a surface which faces collector plate B.

[6] The fuel cell stack according to [5] above, further including an elastic member disposed between end plate B and collector plate B, wherein the concaved portion of end plate B holds therein the elastic member, and a bottom surface of the concaved portion includes a second convexed portion and a second concaved portion.

[7] The fuel cell stack according to [5] above, wherein no elastic member is disposed between end plate B and collector plate B, a surface of end plate B which faces collector plate B is a contact surface with respect to collector plate B, and a top surface of the convexed portion of end plate B contacts collector plate B.

[8] The fuel cell stack according to [7] above, wherein the total area of the top surface of the convexed portion of end plate B which contacts collector plate B is 10-30% of the area of a region where end plate B and collector plate B face each other.

[9] The fuel cell stack according to [7] or [8] above, wherein the convexed portion on the surface of end plate B which faces collector plate B includes a rib forming a lattice.

[10] The fuel cell stack according to any one of [1] to [9] above, wherein the end plates are made of resin.

ADVANTAGEOUS EFFECTS OF INVENTION

In a fuel cell stack according to the present invention, less heat is conducted from collector plates to end plates because the contact area between the end plate and collector plate is small. Moreover, because the contact area between the end plate and elastic members is small, less heat is conducted to the end plates through the elastic members for dissipation. This enables efficient recovery of heat generated during power generation; therefore, it is possible to provide a fuel cell stack that can achieve high heat recovery efficiency.

Moreover, in the fuel cell stack according to the present invention, the end plates are hard to be deformed even when a ring band is used to hold the fuel cell stack. It is thus possible to apply a uniform load to the cell assembly to reduce contact resistance between unit cells. Accordingly, the fuel cell stack according to the present invention exhibits high power generation efficiency.

BEST MODE FOR CARRYING OUT THE INVENTION

Figure 1:
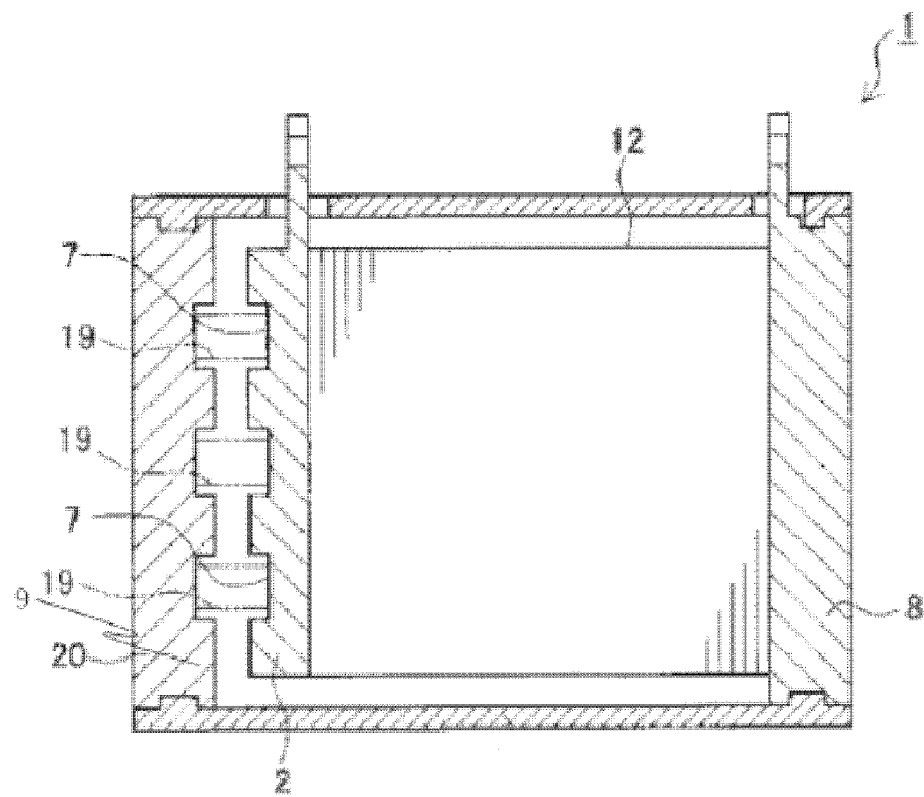
FIG. 1 is a cross-sectional view of a conventional fuel cell stack.

A fuel cell stack according to the present invention includes 1) a cell assembly; 2) a pair of collector plates which sandwiches the cell assembly; 3) a pair of end plates which sandwiches the cell assembly and collector plates; and 4) one or more elastic members disposed between the end plate and the collector plate.

1) Cell Assembly

"Cell assembly" means a stack of unit cells, each consisting of a membrane electrode assembly (MEA) and a pair of separators which sandwiches the MEA.

The MEA includes a polymer electrolyte membrane and a pair of catalyst electrodes (fuel electrode and air electrode) which sandwiches the polymer electrolyte membrane. Preferably, the catalyst electrodes each include a catalyst layer which contacts the polymer electrolyte membrane, and a gas diffusion layer disposed on the catalyst layer.

The polymer electrolyte membrane is a polymer membrane which selectively transports protons in a humidified state. Materials of the polymer electrolyte membrane are not specifically limited as long as protons can be selectively transported; examples thereof include fluorine polymer electrolyte membranes and hydrocarbon polymer electrolyte membranes. Specific examples of fluorine polymer electrolyte membranes include Nafion® membranes (DuPont), Flemion® membranes (Asahi Glass Co., Ltd.), Aciplex® membranes (Asahi Kasei Corporation), and GORE-SELECT® membranes (Japan Gore-Tex Inc.).

The catalyst layer contains a catalyst which promotes a redox reaction of hydrogen or oxygen. The catalyst layer is not specifically limited as long as it is electrically conductive and is catalytically active for the redox reaction of hydrogen and oxygen. The catalyst layer on the air electrode side contains as a catalyst platinum, platinum-cobalt alloy, platinum-cobalt-nickel alloy or the like. On the other hand, the catalyst layer on the fuel electrode side contains platinum, platinum-ruthenium alloy or the like.

The catalyst layer is prepared for instance by applying on a polymer electrolyte membrane a mixture of (i) carbon fine particles (e.g., acetylene black, Ketjen Black or Vulcan) bearing the catalyst, (ii) a proton conductive electrolyte, and (iii) water-repellent resin such as PTFE.

The gas diffusion layer is a porous layer having electric conductivity. The material of the gas diffusion layer is not specifically limited as long as the material is electrically conductive and is capable of diffusing a reaction gas. The gas diffusion layer may be composed of a gas diffusion base material layer that diffuses a gas supplied from the separator side to the catalyst layer, and a carbon coat layer that improves contact between the gas diffusion layer and the catalyst layer.

The separator is an electrically conductive plate which includes a fuel gas flow channel on the surface in contact with the fuel electrode, and an oxidizing gas flow channel on the surface in contact with the air electrode. Examples of materials used for the separator include carbon and metal. The surface of the separator with a gas flow channel has concaved and convexed portions; the concaved portions constitute the flow channel. The separator includes a coolant supply manifold and a coolant discharge manifold. The separator further includes a fuel gas supply manifold, a fuel gas discharge manifold, an oxidizing gas supply manifold, and an oxidizing gas discharge manifold. The separator may further include a rubber sealing member for preventing leakage of coolant, oxidizing gas or fuel gas.

2) A Pair of Collector Plates

A pair of collector plates consists of a pair of electrically conducive members (collector plates A and B) which sandwiches a cell assembly in the cell stacking direction. The collector plate extracts a direct current generated in the cell assembly. The collector plate further includes a power extraction unit for extracting electric power generated in the fuel cell stack. Examples of materials used for the collector plate include metallic materials such as stainless steel and copper, and carbon materials. The collector plate may be a gold-plated metal plate made of stainless steel or copper.

3) A Pair of End Plates

A pair of end plates consists of end plates A and B which sandwiches the cell assembly and the collector plate pair in the cell stacking direction. The end plates respectively constitute ends of the fuel cell stack in the cell stacking direction. More specifically, end plate A constitutes the collector plate A side-end of the fuel cell stack, and end plate B constitutes the collector plate B side-end of the fuel cell stack. Accordingly, end plate A has a surface facing collector plate A, and end plate B has a surface facing collector plate B.

The end plate includes: a fuel gas supply port for supplying a fuel gas to the fuel cell stack; a fuel gas discharge port for discharging the fuel gas from the fuel cell stack; an oxidizing gas supply port for supplying an oxidizing gas to the fuel cell stack; an oxidizing gas discharge port for discharging the oxidizing gas from the fuel cell stack; a coolant supply port for supplying a coolant in the fuel cell stack; and a coolant discharge port for discharging the coolant from the fuel cell stack.

The material for the end plate is preferably selected from resins with low thermal conductivity, because by employing resins with low thermal conductivity it becomes possible to reduce the amount of heat conducted to the end plate from the collector plate and thus to reduce heat loss to the outside. Examples of such resins include thermoplastic resins such as polyphenylene sulfide and thermally curable resins such as phenol resins.

In the present invention, at least a surface of end plate A which faces collector plate A (hereinafter also referred to as "collector plate-side surface") has a concavo-convex shape, i.e., concaved portions and convexed portions. Herein, "convexed portion" includes a rib and the like formed on the collector plate side-surface of the end plate, and "concaved portion" means an area defined by the convexed portion. A plurality of concaved portions formed in the collector plate side-surface of end plate A includes concaved portions for holding therein elastic members (later described).

The shape of end plate B is not specifically limited; however, the collector plate side-surface of end plate B preferably has convexed portions and concaved portions as with end plate A.

4) Elastic Member

A fuel cell stack according to the present invention includes an elastic member at least between end plate A and collector plate A. The elastic member is provided to apply a uniform load to the cell assembly. The number of elastic members can be either one or more. Examples thereof include coil springs. On the other hand, such an elastic member may or may not be provided between end plate B and collector plate B (see Embodiments 1 and 2).

A feature of the fuel cell stack according to the present invention lies in the shapes of the concaved portion and convexed portion on the collector plate side-surface of end plate A. Hereinafter, the shapes of the concaved portion and convexed portions will be described with reference to the drawings.

Figure 2:
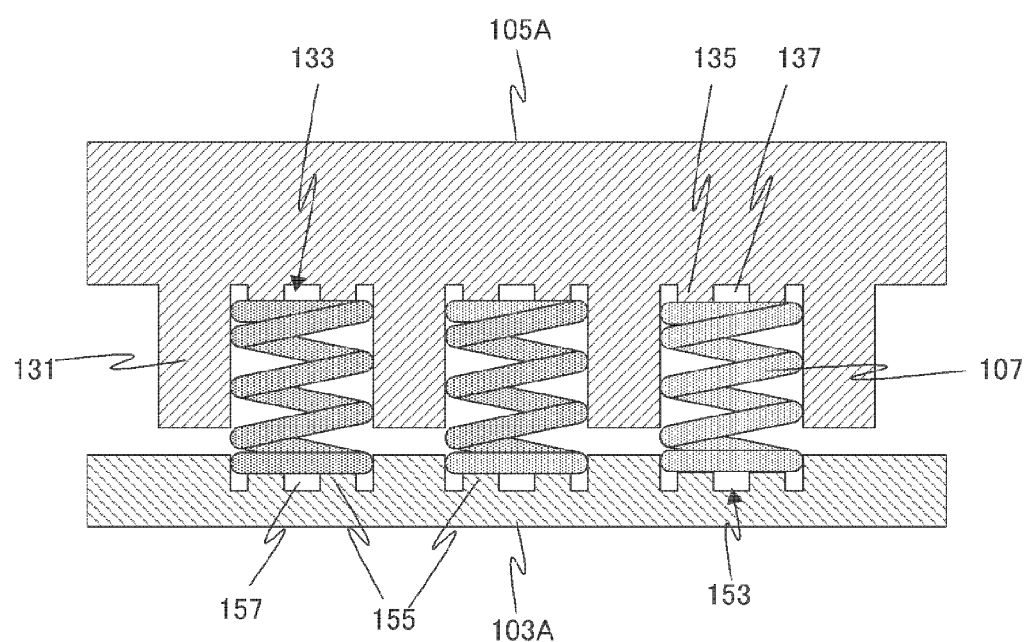
FIG. 2 is a cross-sectional view of end plates, elastic members and collector plates of a fuel cell stack according to the present invention.

FIG. 2 is a cross-sectional view illustrating end plate A, collector plate A and elastic members of a fuel cell stack according to an embodiment of the present invention. Because more than one elastic member 107 is disposed between end plate 105A and collector plate 103A as illustrated in FIG. 2, end plate 105A and collector plate 103A do not directly contact each other.

Convexed portions 131 and concaved portions 133 are provided on the collector plate side-surface of end plate 105A. Concaved portions 133 hold therein elastic members 107. Hereinafter, concaved portion 133 which holds therein elastic member 107 will also be referred to as "concaved holder portion 133."

The shape of concaved holder portion 133 is appropriately determined depending on the shape of elastic member 107. For example, when elastic member 107 is a coil spring as illustrated in FIG. 2, it is preferable to design the shape of concaved holder portion 133 to conform to the shape of the coil spring, e.g., cylindrical shape.

As illustrated in FIG. 2, it is also preferable to provide concaved portions 153 on the surface of collector plate 103A which faces end plate 105A.

The present invention is characterized in that the bottom surface of concaved holder portion 133 of end plate 105A further includes concaved and convexed portions. More specifically, the bottom surface of concaved holder portion 133 includes second convexed portions 135 and second concaved portions 137. The height of second convexed portion 135 is smaller than the height of convexed portion 131 or rib. The top surface of second convexed portion 135 contacts elastic member 107. A part of elastic member 107 comes right above second concaved portions 137. The bottom surfaces of second concaved portions 137 do not contact elastic member 107; thus, partially, elastic member 107 does not contact the bottom surface of concaved holder portion 133. This reduces the contact area between elastic member 107 and end plate 105A.

In the present invention, it is preferable that the contact area between elastic member 107 and collector plate 103A be also small. This can be achieved by forming concaved portions 153 for holding elastic members 107 to collector plate 103A (hereinafter also referred to as "concaved holder portions 153") and forming convexed or concaved portions on the bottom surface of concaved holder portions 153, as illustrated in FIG. 2. More specifically, the bottom surface of concaved holder portion 153 may include third convexed portions 155 and third concaved portions 157. The top surface of third convexed portion 155 contacts elastic member 107. On the other hand, a part of elastic member 107 comes right above third concaved portions 157. The bottom surfaces of third concaved portions 157 do not contact elastic member 107; thus, partially, elastic member 107 does not contact the bottom surface of concaved holder portion 153. This reduces the contact area between the elastic member and end plate.

By arranging elastic members between end plate A and collector plate A in this way, end plate A and collector plate A do not directly contact each other. Thus, air trapped between end plate A and collector plate A functions as a heat insulating material that reduces the amount of heat that is conducted to end plate A from collector plate A, thus reducing heat loss from the fuel cell stack.

Moreover, by reducing the contact area between the elastic member and end plate A, the amount of heat that is conducted to end plate A from collector plate A via the elastic members decreases, thus reducing heat loss from the fuel cell stack.

Since heat loss from the fuel cell stack according to the present invention is small as described above, it is possible to efficiently recover heat generated along with power generation of the fuel cell stack.

In a fuel cell stack having the above structure, it is preferable to apply load to the cell assembly. There are no particular limitations to the load application method; for example, a rigid ring band may be wrapped around a stack consisting of a cell assembly, collector plates and end plates (hereinafter also simply referred to as a "stack") in a state where load is applied to the stack, so that those components are secured together. Alternatively, for example, the cell assembly, collector plates and end plates of the stack may be secured by fastening rods while applying load to the stack. Application of load to the cell assembly reduces contact resistance in and between unit cells, thereby increasing the power output of the fuel cell stack.

Another feature of a fuel cell stack according to the present invention is the shape of an end plate at the time when the fuel cell stack is secured by a ring band. More specifically, when the fuel cell stack is to be secured by a ring band, the surface of the end plate which faces the ring band (hereinafter also referred to as "ring band-side surface") preferably has convexed portions and concaved portions as well as is convexly curved (see FIGS. 6 and 7). The following describes the end plate shape with respect to a) ring band side-surface and b) collector plate side-surface for the fuel cell stack secured by a ring band.

a) Ring Band-Side Surface of End Plate

Figure 6:
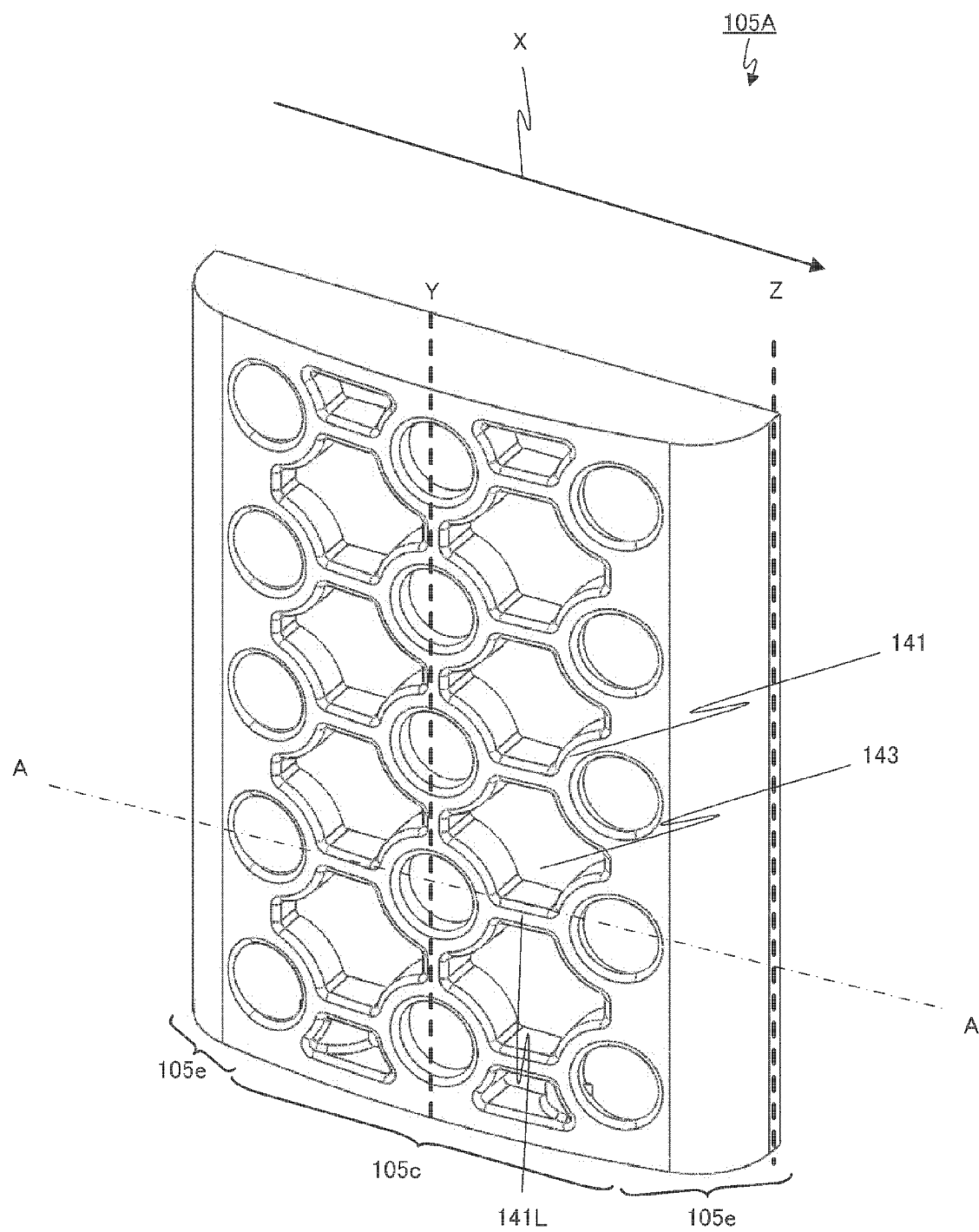
FIG. 6 is a perspective view of the end plate according to Embodiment 1 as seen from the ring band side.

When a ring band is used to secure a fuel cell stack, the ring band-side surface of an end plate is designed to have a concavo-convex shape, i.e., concaved portions and convexed portions (see FIG. 6). Herein, "convexed portion" includes a rib and the like formed on the ring band side-surface of the end plate, and "concaved portion" means an area defined by the convexed portion.

The top surfaces of convexed portions of the ring band-side surface of the end plate contact the ring band, whereas concaved portions do not contact the ring band. In this way the ring band makes contacts exclusively with the top surfaces of the convexed portions, not with the concaved portions. Thus, the contact area between the ring band and end plate is small. By reducing the contact area between the ring band and end plate as described above, the amount of heat that is conducted to the ring band from the end plate decreases, thereby reducing heat loss from the fuel cell stack and enabling efficient recovery of heat generated during power generation.

It is also preferable that the convexed portions (ribs) formed on ring band-side surface of end plates run along the ring band circumferential direction (see FIG. 6). With this configuration, the rigidity of the end plate in the ring band circumferential direction can be increased enough to prevent end plate deformation when a ring band is used to secure the stack. If the end plates are deformed, it results in failure to uniformly apply load to the cell assembly, whereby contact resistance in and between unit cells increases and thus the efficiency of power generation. The ring band-side surface of the end plate may, of course, include ribs other than those running along the ring band circumferential direction.

In addition, the ring band-side surface of the end plate is preferably a convexly curved surface which includes a top line (see line Y shown in FIG. 6) and bottom lines (see lines Z shown in FIG. 6). Herein, "bottom line" means, among the four sides of the ring band-side surface of an end plate, a side that runs in parallel to the top line. The top line and bottom line are both perpendicular to the ring band circumferential direction. The ring band-side surface (convexly curved surface) consists of a central region which includes the top line (see reference 105c shown in FIG. 6) and of side regions on either side of the central region, each including a bottom line (see reference 105e shown in FIG. 6). The central region and side region both have a curved surface. The central region and side region preferably have different curvature radii. More specifically, the curvature radius of the central region (see reference "α" shown in FIG. 7) is preferably larger than the curvature radii of the side regions (see reference "β" shown in FIG. 7).

By making the ring band-side surface of the end plate convexly curved, it is possible to apply uniform load to the cell assembly and thus to reduce contact resistance in and between unit cells. Moreover, by making the curvature radius of the central region larger than those of the side regions, it is possible to scatter the ring band's stress imposed on the end plate. This reduces the likelihood of deformation of the end plate even when it is made thin.

Also in the present invention, the area ratio of a side region which contacts a ring band to the total area of that side region (hereinafter also referred to as "side region's contact area ratio") is preferably high (see FIG. 6). By increasing the side region's contact area ratio, it is possible to scatter the ring band's stress imposed on the end plate and thus to enhance the effectiveness of preventing the deformation of the end plate.

More specifically, the side region's contact area ratio is preferably larger than the area ratio of the central region which contacts a ring band to the total area of the central region (hereinafter also referred to as "central region's contact area ratio"). Specifically, the side region's contact area ratio is preferably 50-100%.

b) Collector Plate-Side Surface of End Plate

Figure 5A:
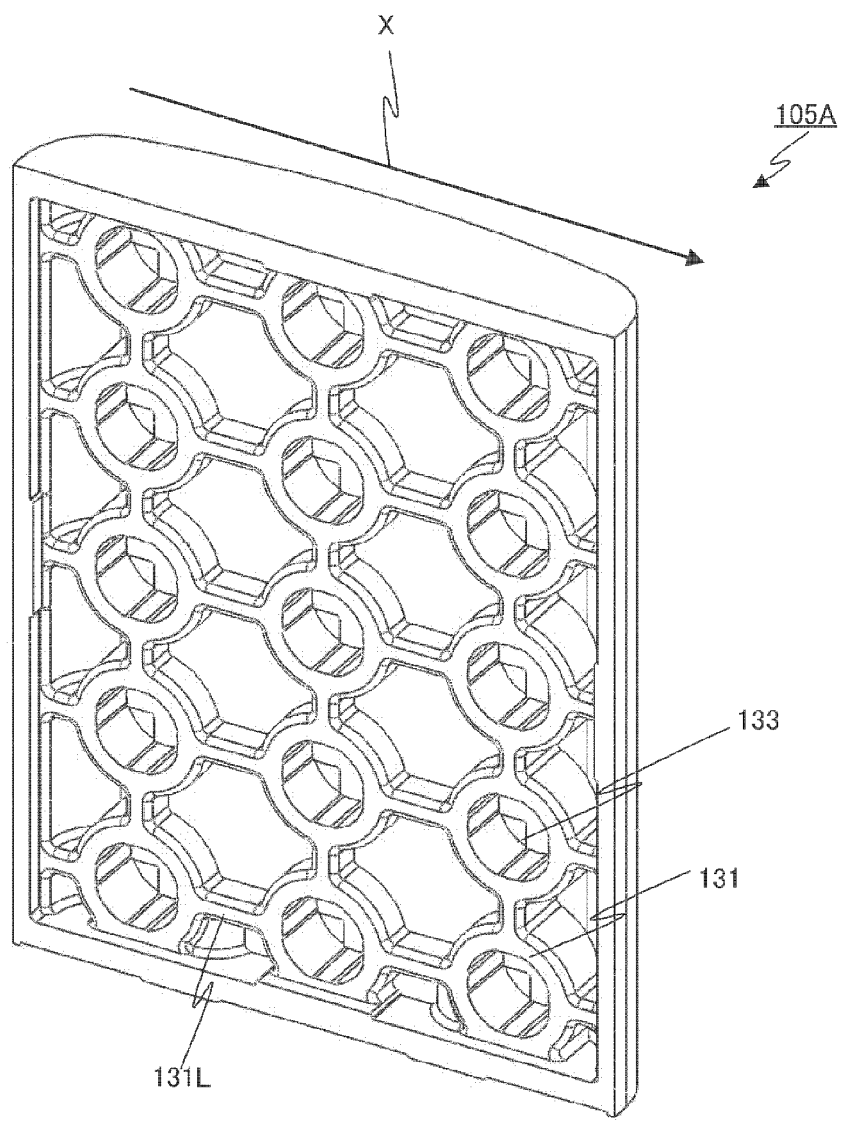
FIG. 5A is a perspective view of an end plate according to Embodiment 1 as seen from the collector plate side.
Figure 5B:
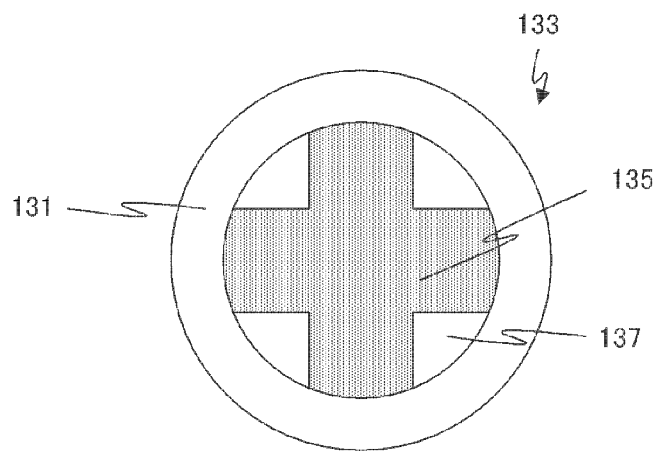
FIG. 5B is an enlarged front view of a concaved holder portion.

When a ring band is used to secure a fuel cell stack, the ribs (convexed portions) formed on the collector plate-side surface of an end plate preferably run along the ring band circumferential direction (see FIGS. 5A and 5B). By making the ribs (convexed portions) on the collector plate-side surface run along the ring band circumferential direction, the strength of the end plate can be enhanced in the ring band circumferential direction. The collector plate-side surface of the end plate may of course have ribs which are not arranged along the ring band circumferential direction.

Figure 13:
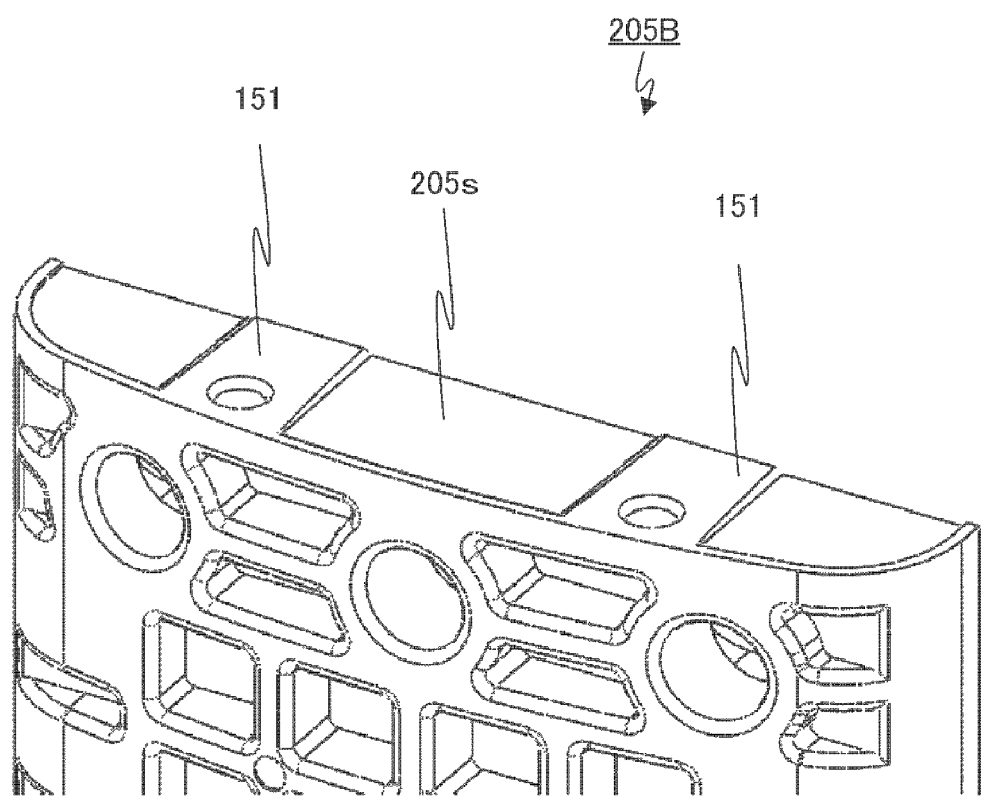
FIG. 13 is a perspective view of the end plate according to Embodiment 2 as seen from the ground side.

In a case where the stack is secured by a ring band, it is preferable to form convexed and concaved portions (see reference 151 shown in FIG. 13) on the ground-side surface of the end plate which is not covered with the ring band (see reference 205s shown in FIG. 13). The side of the fuel cell stack which is not covered with the ring band may serve as a ground surface. When the ground surface has convexed and concaved portions, heat loss from the ground surface can be suppressed.

Thus, with the configuration of a fuel cell stack according to the present invention, end plates are less likely to be deformed even when a ring band is used to secure the fuel cell stack. It is thus possible to apply uniform load to the cell assembly and to reduce contact resistance in and between unit cells; therefore, it is possible to achieve high power generation efficiency.

Embodiments of a fuel cell stack according to the present invention will be described with reference to the drawings.

Embodiment 1

Embodiment 1 describes a fuel cell stack in which two or more elastic members are provided between end plate A and collector plate A as well as between end plate B and collector plate B.

Figure 3:
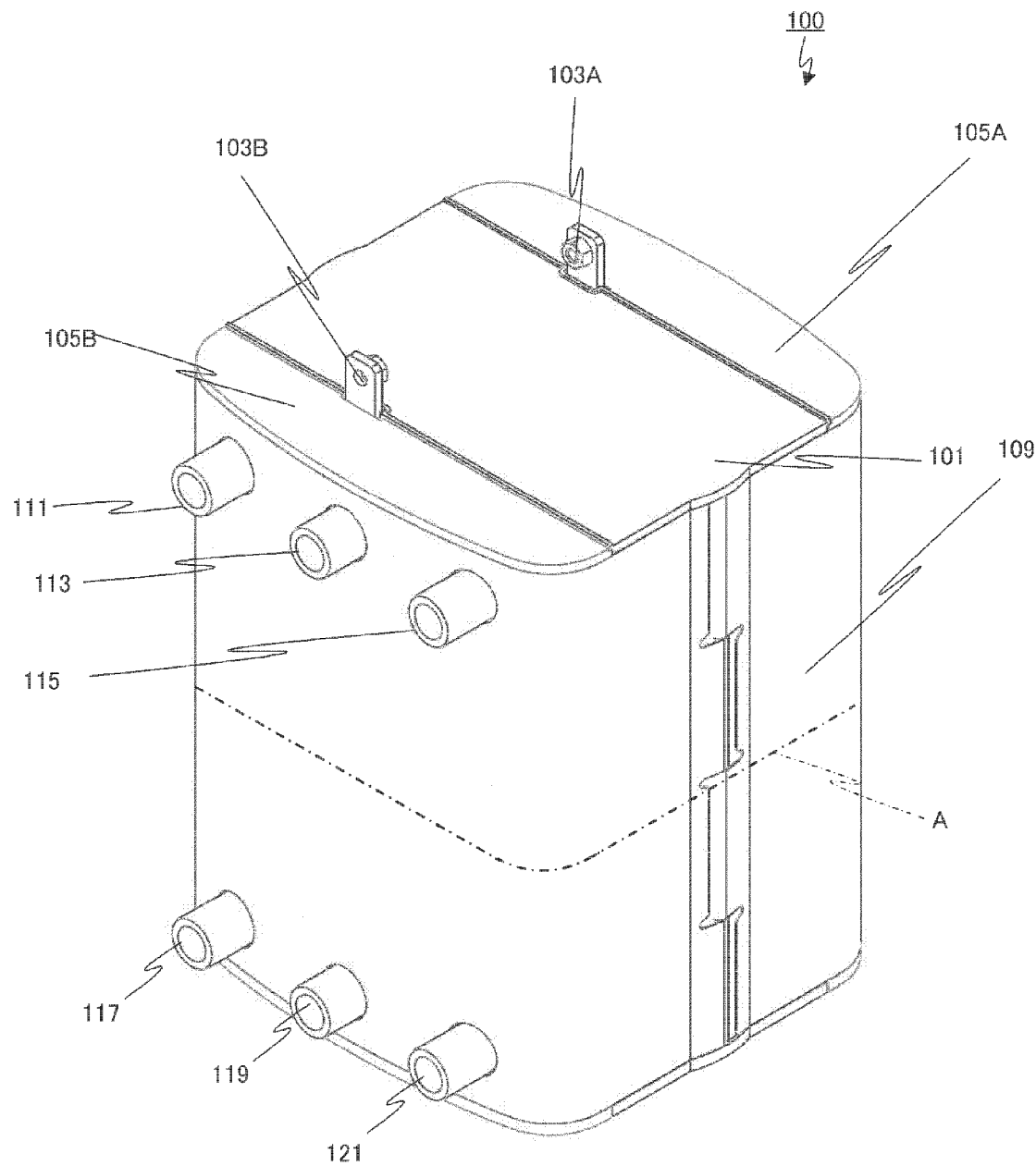
FIG. 3 is a perspective view of a fuel cell stack according to Embodiment 1.

FIG. 3 is a perspective view of fuel cell stack 100 according to Embodiment 1. As illustrated in FIG. 3, fuel cell stack 100 includes cell assembly 101, a pair of collector plates 103A and 103B, elastic members 107 (not shown), a pair of end plates 105A and 105B, and ring band 109. Fuel cell stack 100 includes oxidizing gas supply port 111, coolant supply port 113, fuel gas supply port 115, fuel gas discharge port 117, coolant discharge port 119, and oxidizing gas discharge port 121.

Figure 4:
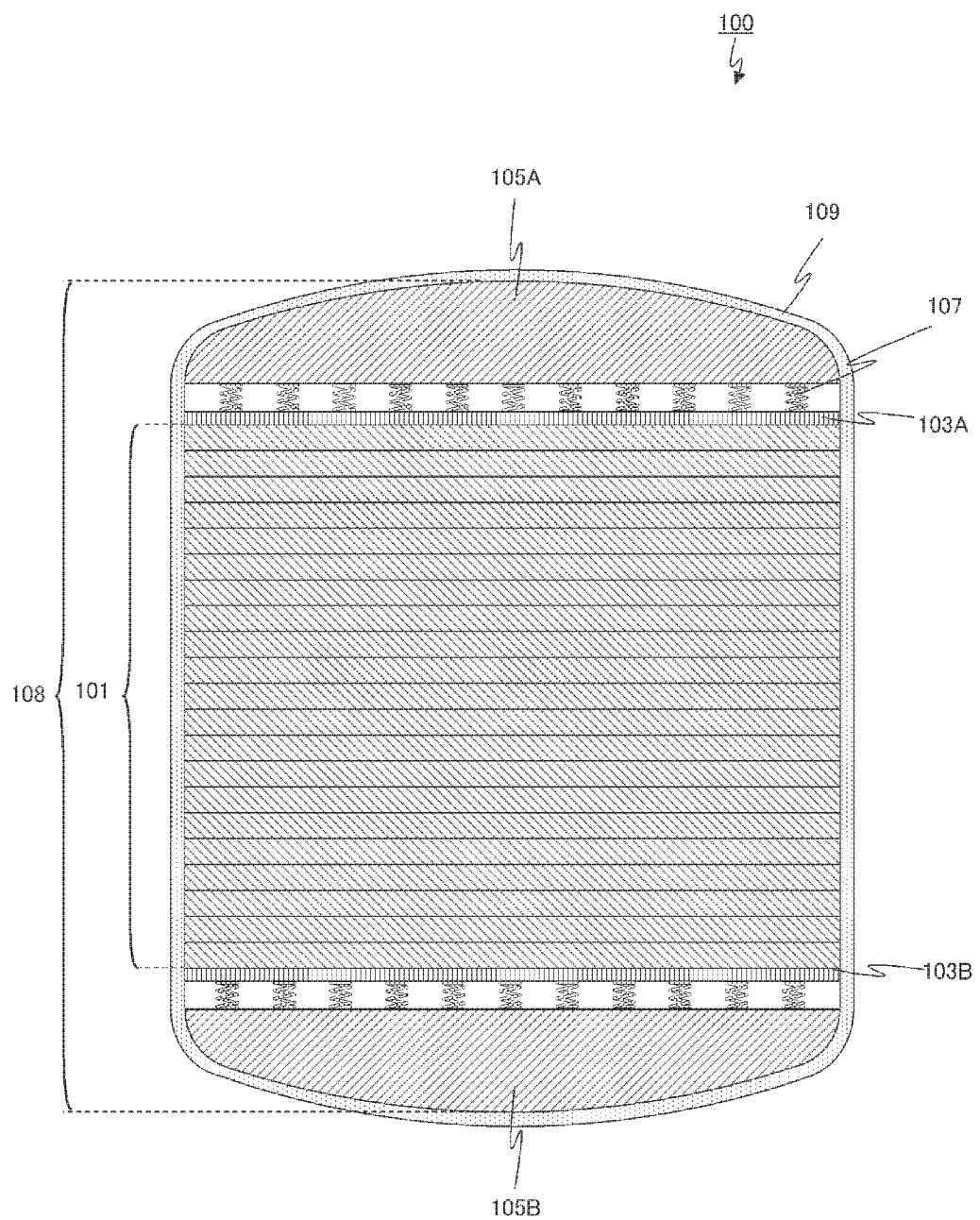
FIG. 4 is a cross-sectional view of a fuel cell stack according to Embodiment 1.

FIG. 4 is a cross-sectional view of fuel cell stack 100 cut along dashed-dotted line A. As illustrated in FIG. 4, cell assembly 101 is sandwiched by a pair of collector plates 103A and 103B, and cell assembly 101 and the collector plate pair are sandwiched by a pair of end plates 105A and 105B. Fuel cell stack 100 further includes a plurality of elastic members 107 between end plate 105A and collector plate 103A as well as between end plate 105B and collector plate 103B. With this configuration, end plate 105A and collector plate 103A do not directly contact each other, and end plate 105B and collector plate 103B do not directly contact each other.

Ring band 109 is wrapped around stack 108 which consists of cell assembly 101, a pair of collector plates pair and a pair of end plate to secure the components together. The shape of end plate 105A will be described in detail below. It should be noted that the description of the shape of end plate 105B is omitted as it is identical to that of end plate 105A.

FIG. 5A is a perspective view of end plate 105A as seen from the collector plate-side surface. As illustrated in FIG. 5A, end plate 105A includes convexed portions 131 on the collector plate-side surface. Raise portions 131 include ribs which define concaved portions. The concaved portions defined by convexed portions 131 include concaved holder portions 133 for holding elastic member 107 therein.

Arrow X in FIG. 5A indicates the ring band circumferential direction. As illustrated in FIG. 5A, end plate 105A includes ribs 131L on the collector plate-side surface along the ring band circumferential direction X.

FIG. 5B is a front view of concaved holder portion 133. As illustrated in FIG. 5B, concaved holder portion 133 includes second convexed portion 135 and second concaved portion 137 on the bottom surface of concaved holder portion 133. The height of second convexed portion 135 is smaller than that of convexed portion 131 of end plate 105A. By forming second convexed portion 135 and second concaved portion 137 in concaved holder portion 133 as described above, elastic member 107 and a part of the bottom surface of concaved holder portion 133 do not directly contact each other. Thus, the contact area between elastic member 107 and end plate 105A decreases (see FIG. 2).

FIG. 6 is a perspective view of end plate 105A as seen from the ring band side-surface. Arrow X in FIG. 6 indicates the ring band circumferential direction. As illustrated in FIG. 6, central region 105c of the ring band side-surface of end plate 105A includes convexed portions 141 and concaved portions 143. Convexed portions 141 include ribs (convexed portions) 141L along the ring band circumferential direction X. The top surfaces of convexed portions 141 contact the ring band. Concaved portions 143, on the other hand, do not contact the ring band. Thus, the contact area between the end plate and ring band is small, whereby less heat is conducted to the ring band from the end plate and heat loss to the outside is small.

The ring band side-surface of end plate 105A is a convexly curved surface which includes top line Y and bottom lines Z, both of which are perpendicular to ring band circumferential direction X. The convexly curved surface consists of central region 105c which includes top line Y and of side regions 105e which include bottom line Z. Central region 105c is sandwiched by side regions 105e.

As described above, central region 105c includes concaved portions 143 which do not contact a ring band, whereas side regions 105e include no concaved portions. For this reason, the contact area ratio of side region 105e is larger than the contact area ratio of central region 105c.

Figure 7:
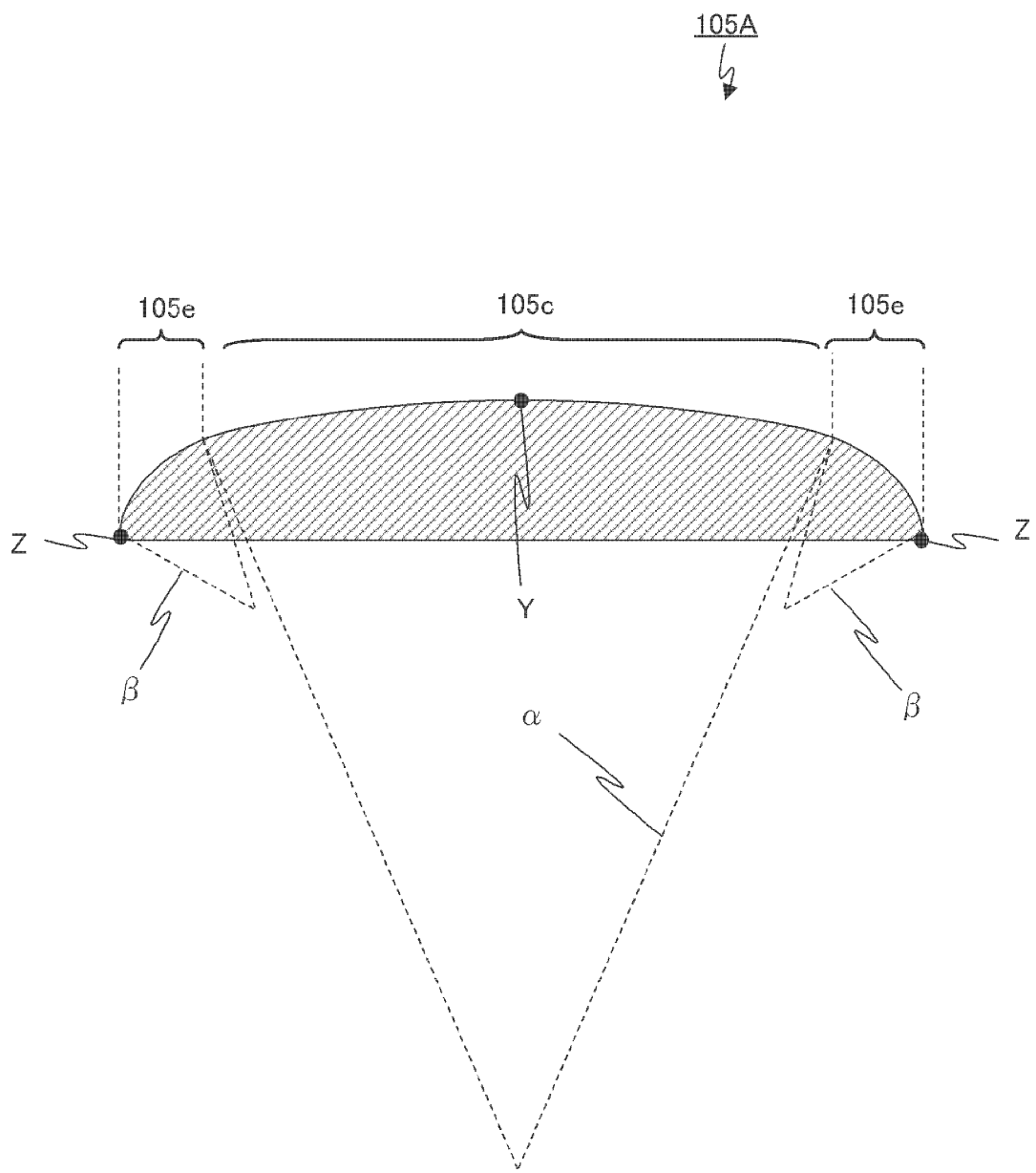
FIG. 7 is a cross-sectional view of the end plate according to Embodiment 1.

FIG. 7 is a cross-sectional view, cut along dashed dotted line A-A, of end plate 105A illustrated in FIG. 6. In FIG. 7, concaved portions 133 are not illustrated. The convexly curved surface consists of central region 105c which includes top line Y and of side regions 105e which include bottom line Z, as illustrated in FIG. 7. The curvature radius α of central region 105c is larger than the curvature radii β of side region 105e, as seen from FIG. 7.

By making the ring band side-surface of end plate 105 convexly curved as described above, it is possible to apply uniform load to the cell assembly.

By increasing the contact area ratio of side region 105e, it is also possible to reduce the convergence of stress applied to end plate 105A by ring band 109. The stress convergence on end plate 105A can be further reduced by making the curvature radius of central region 105c larger than those of side regions 105e, whereby the thickness of end plate 105A can be reduced.

Figure 8A:
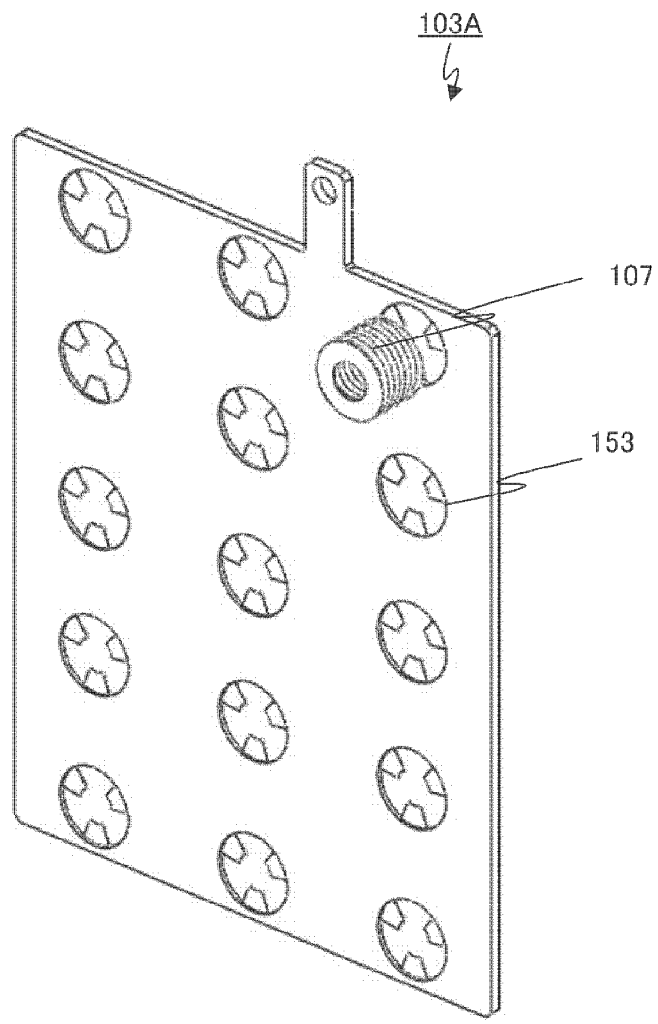
FIG. 8A is a perspective view of a collector plate according to Embodiment 1 as seen from the end plate side.

The shape of collector plate 103A will be described below. It should be noted that the description of the shape of collector plate 103B is omitted as it is identical to that of collector plate 103A. FIG. 8A is a perspective view of collector plate 103A as seen from the end plate 105A side. As illustrated in FIG. 8A, collector plate 103A includes concaved holder portions 153 for holding elastic members 107 therein.

Figure 8B:
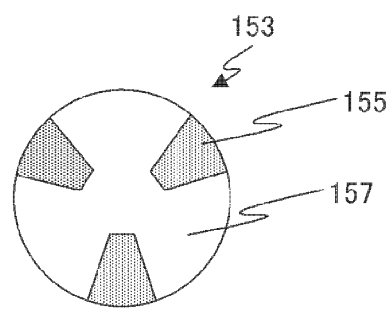
FIG. 8B is an enlarged front view of a concaved holder portion.

FIG. 8B is a front view of concaved holder portion 153 of collector plate 103A. As illustrated in FIG. 8B, concaved holder portion 153 includes third convexed portion 155 and third concaved portions 157 on the bottom surface. By forming third convexed portion 155 and third concaved portions 157 in concaved holder portions 153 of collector plate 103A, the contact area between elastic member 107 and collector plate 103A decreases (see FIG. 2).

As described above, in this embodiment, the end plate and collector plate do not directly contact each other. In this embodiment, the contact area between the elastic member and end plate and the contact area between the elastic member and collector plate are also small. Thus, less heat is conducted to the end plate from the collector plate, and heat loss to the outside is small. This allows for efficient recovery of heat generated during power generation.

In this embodiment, end plates are less likely to be deformed even when a ring band is used to secure the fuel cell stack. It is thus possible to apply uniform load to the cell assembly to obtain high power generation efficiency.

Embodiment 2

In Embodiment 1, a fuel cell stack has been described in which elastic members are provided between end plate B and collector plate B in addition to between end plate A and collector plate A. In Embodiment 2, a fuel cell stack will be described in which elastic members are not provided between end plate B and collector plate B.

Figure 9:
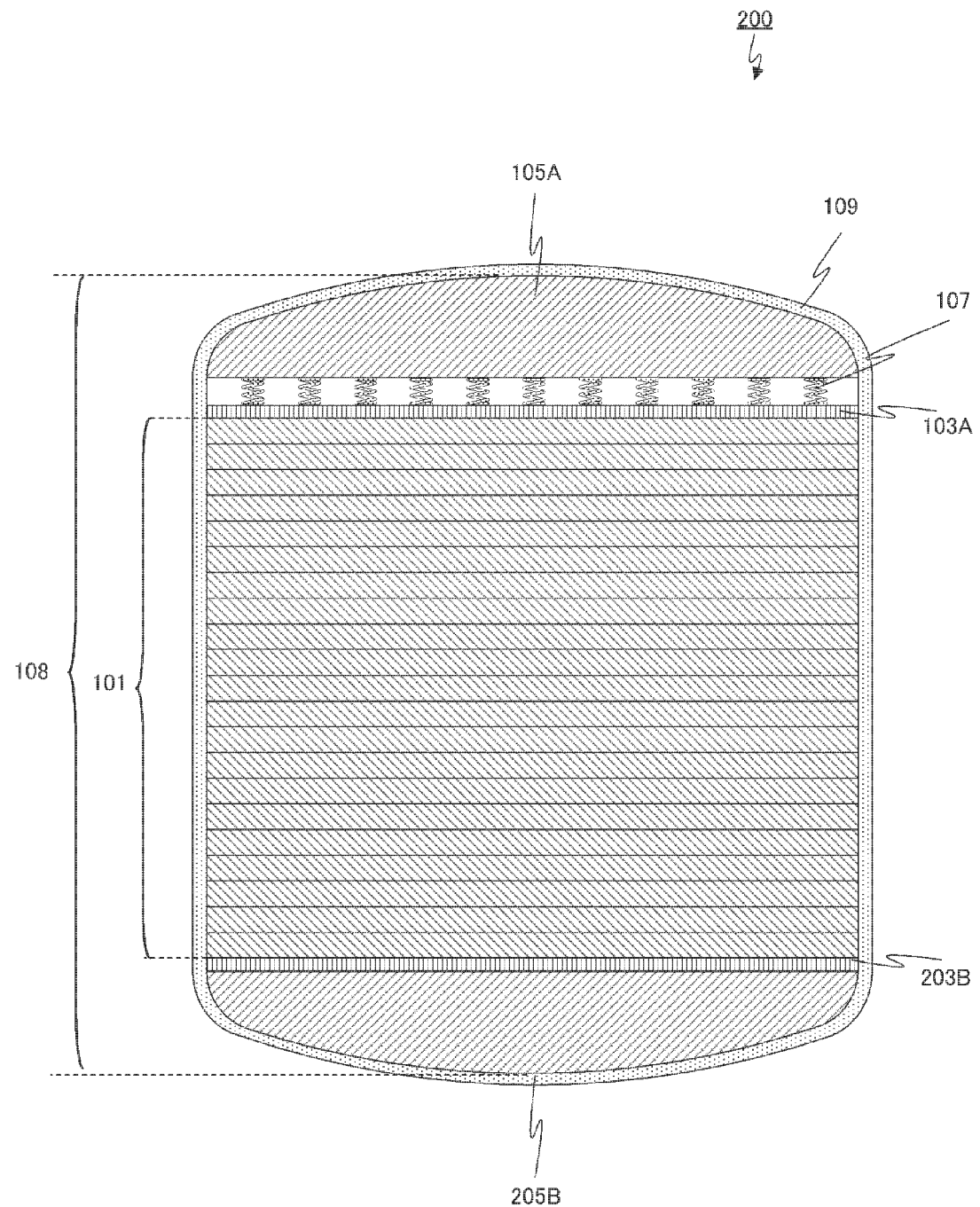
FIG. 9 is a cross-sectional view of a fuel cell stack according to Embodiment 2.

FIG. 9 is a cross-sectional view of fuel cell stack 200 of Embodiment 2. As illustrated in FIG. 9, fuel cell stack 200 includes elastic members 107 provided between end plate 105A and collector plate 103A, but includes no elastic members 107 between end plate 205B and collector plate 203B. Thus, the collector plate side-surface of end plate 205B serves as a contact surface with respect to collector plate 203B. In this embodiment, collector plate 203B includes no concaved portions unlike collector plate 103A.

Fuel cell stack 200 of Embodiment 2 is identical to fuel cell stack 100 of Embodiment 1 except for the shapes of end plate 205B and collector plate 203B. The same components as those of fuel cell stack of Embodiment 1 are given the same references, and descriptions thereof are omitted.

Figure 10:
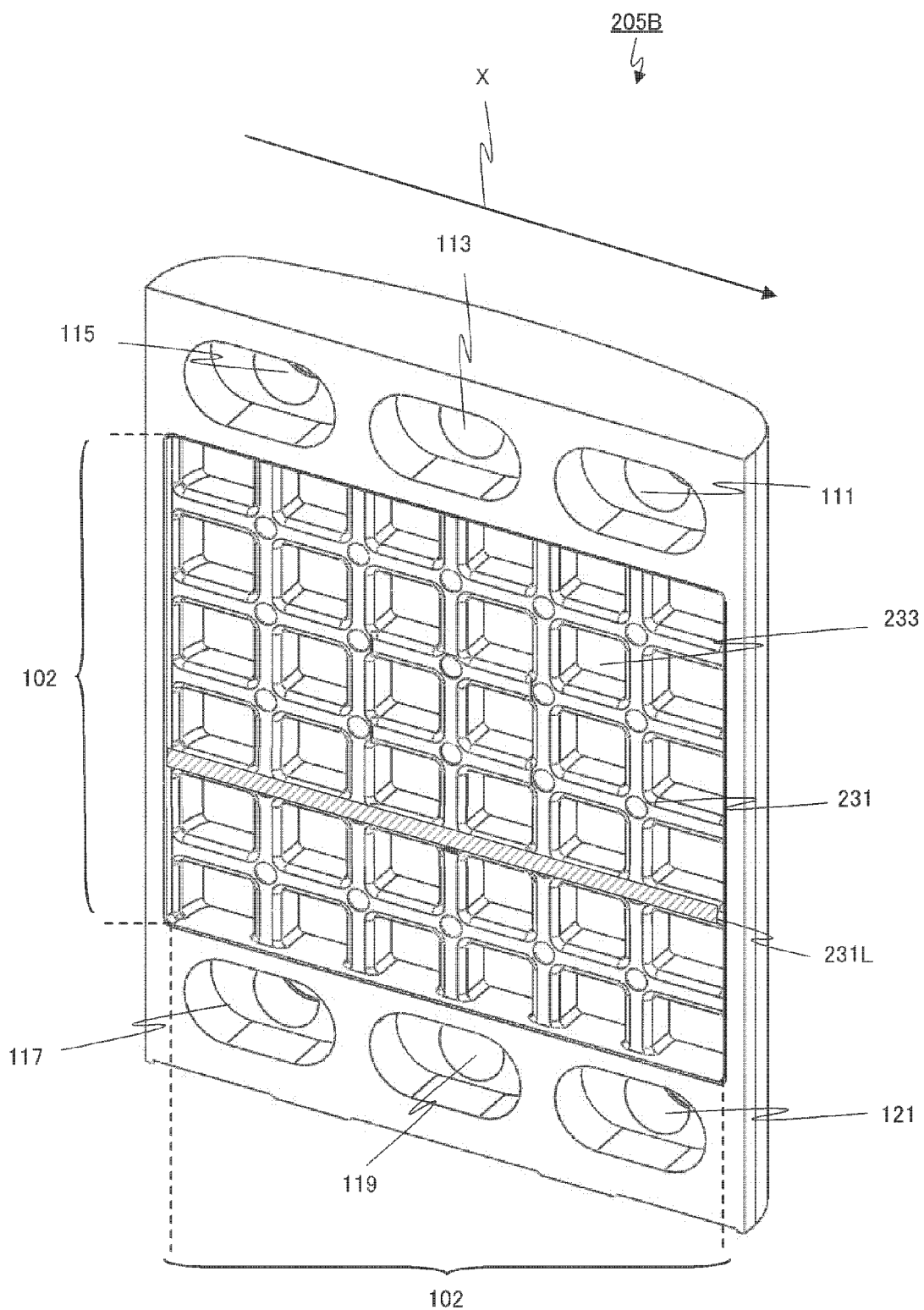
FIG. 10 is a perspective view of an end plate according to Embodiment 2 as seen from the collector plate side.

FIG. 10 is perspective view of end plate 205B as seen from the collector plate side-surface. Arrow X in FIG. 10 indicates the ring band circumferential direction. As illustrated in FIG. 10, the collector plate side-surface of end plate 205B includes convexed portions 231 and concaved portions 233. Convexed portions 231 include ribs which define concaved portions 233.

On the collector plate side-surface of end plate 205B, ribs 231 form a lattice. By the lattice formed by the ribs, the strength of the end plate can be ensured even when the collector plate side-surface includes convexed and concaved portions.

The collector plate side-surface of end plate 205B includes ribs 231L along ring band circumferential direction X. Ribs 231L running along ring band circumferential direction X extend farther to the both sides of region 102 where end plate 205B and collector plate 203B face each other.

Figure 11:
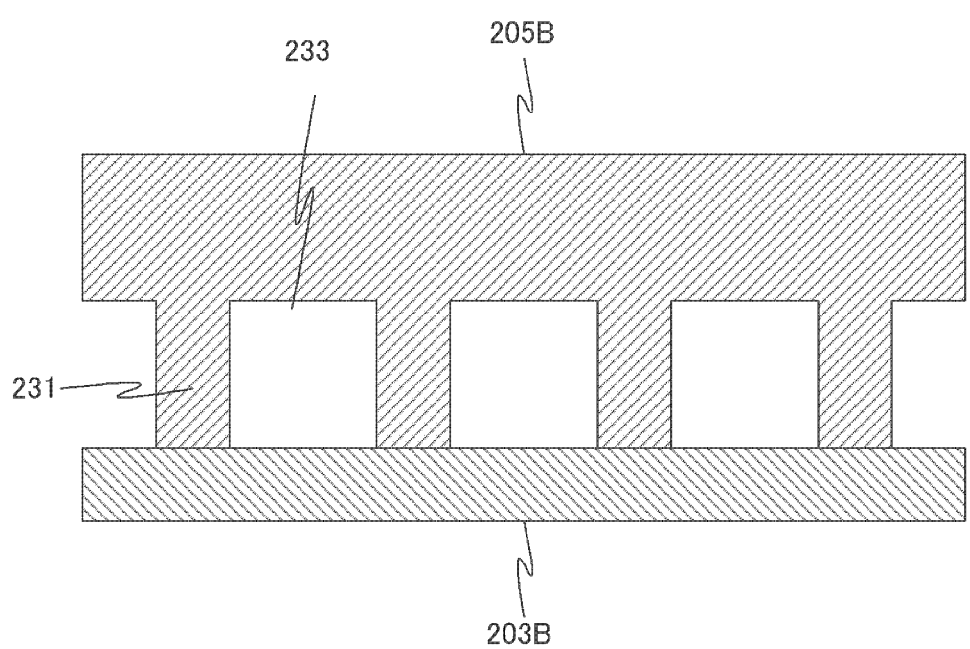
FIG. 11 is a cross-sectional view of the end plate and collector plate according to Embodiment 2.

FIG. 11 illustrates a state where end plate 205B and collector plate 203B contacted each other. As illustrated in FIG. 11, end plate 205B contacts collector plate 203B at the top surfaces of convexed portions 231. Concaved portions 233 of the collector plate side-surface of end plate 205B, on the other hand, do not contact collector plate 203B.

The total area of the top surfaces of convexed portions 231 of end plate 205B which contact collector plate 203B (contact area between end plate 205B and collector plate 203B) is preferably 10-30% of the total area of region 102 (see FIG. 10) where end plate 205B and collector plate 203B face each other. When the area ratio is less than 10%, there is a concern that convexed portions 231 cannot endure the pressure from collector plate 203B, which results in deformation of end plate 205B. On the other hand, when the area ratio is greater than 30%, there is a concern that the amount of heat conducted to end plate 205B from collector plate 203B increases to an extent that prevents efficient recovery of heat generated during power generation.

By reducing the contact area between collector plate 203B and end plate 205B as described above, the amount of heat conducted to end plate 205B from collector plate 203B decreases even when collector plate 203B and end plate 205B directly contact each other. This reduces heat loss from the fuel cell stack.

Figure 12:
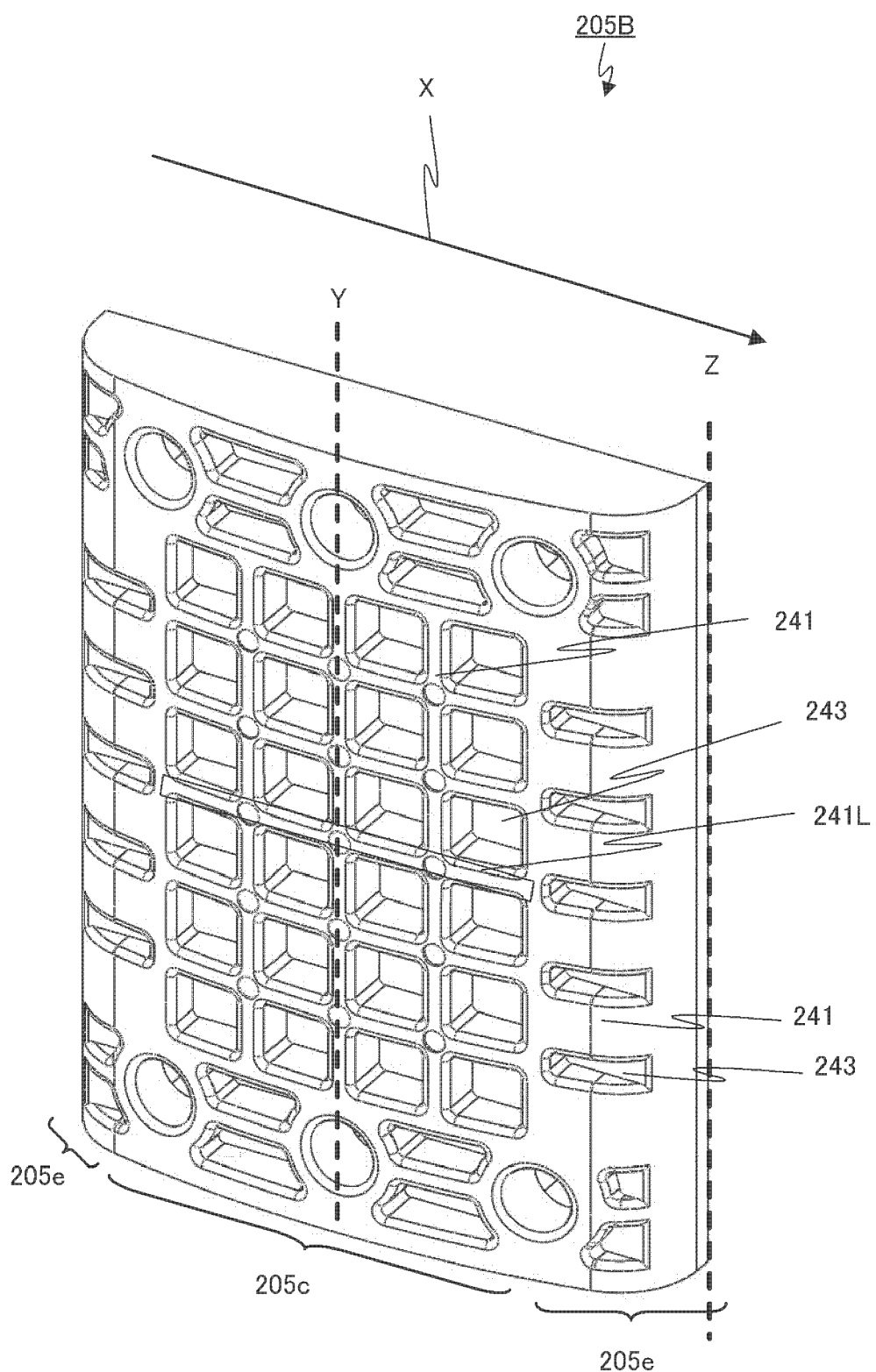
FIG. 12 is a perspective view of the end plate according to Embodiment 2 as seen from the ring band side.

FIG. 12 is a perspective view of end plate 205B as seen from the ring band side-surface. Arrow X in FIG. 12 indicates the ring band circumferential direction. As illustrated in FIG. 12, the ring band side-surface of end plate 205B is a convexly curved surface which includes ring band circumferential direction X, and top line Y and bottom lines Z which are perpendicular to ring band circumferential direction X. The convexly curved surface consists of central region 205c which includes top line Y and of side regions 205e which include bottom line Z. Central region 205c is sandwiched by side regions 205e.

The ring band side-surface of end plate 205B includes convexed portions 241 and concaved portions 243. Convexed portions 241 on the ring band side-surface of end plate 205B include ribs; ribs 241 form a lattice in central region 205c. The ring band side-surface of end plate 205B includes ribs (convexed portions) 241L along ring band circumferential direction X. The top surfaces of convexed portions 241 contact the ring band, whereas concaved portions 243 do not contact the ring band.

The sizes of concaved portions 243 which do not contact the ring band are smaller in side region 205e, but are larger in central region 205c. Thus, the contact area ratio of side region 205e is larger than the contact area ratio of central region 205c.

FIG. 13 is a perspective view of end plate 205B as seen from ground surface 205s. As illustrated in FIG. 13, ground surface 205s of end plate 205B includes convexed portions 151. By forming convexed portions 151, it is possible to reduce the contact area between ground surface 205s of end plate 205B and the ground, thereby further reducing heat loss to the outside.

Since the fuel cell stack according to this embodiment includes no elastic members disposed between end plate B and collector plate B as described above, the component count is small. Thus, according to this embodiment, it is possible to provide an easy-to-assemble fuel cell stack which provides the same effect as that of Embodiment 1.

Embodiment 3

In Embodiment 3, a fuel cell stack will be described in which the collector plate side-surface of end plate 205B of fuel cell stack cell 200 of Embodiment 2 has a region which includes protrusions. The fuel cell stack according to this embodiment includes no elastic members between end plate B and collector plate B like fuel cell stack 200 of Embodiment 2.

Fuel cell stack 300 of Embodiment 3 is identical to fuel cell stack 200 of Embodiment 2 except for the presence of a region which includes protrusions at the center of the collector plate side-surface of end plate B. Thus, descriptions of components other than end plate B are omitted in Embodiment 3.

Figure 14:
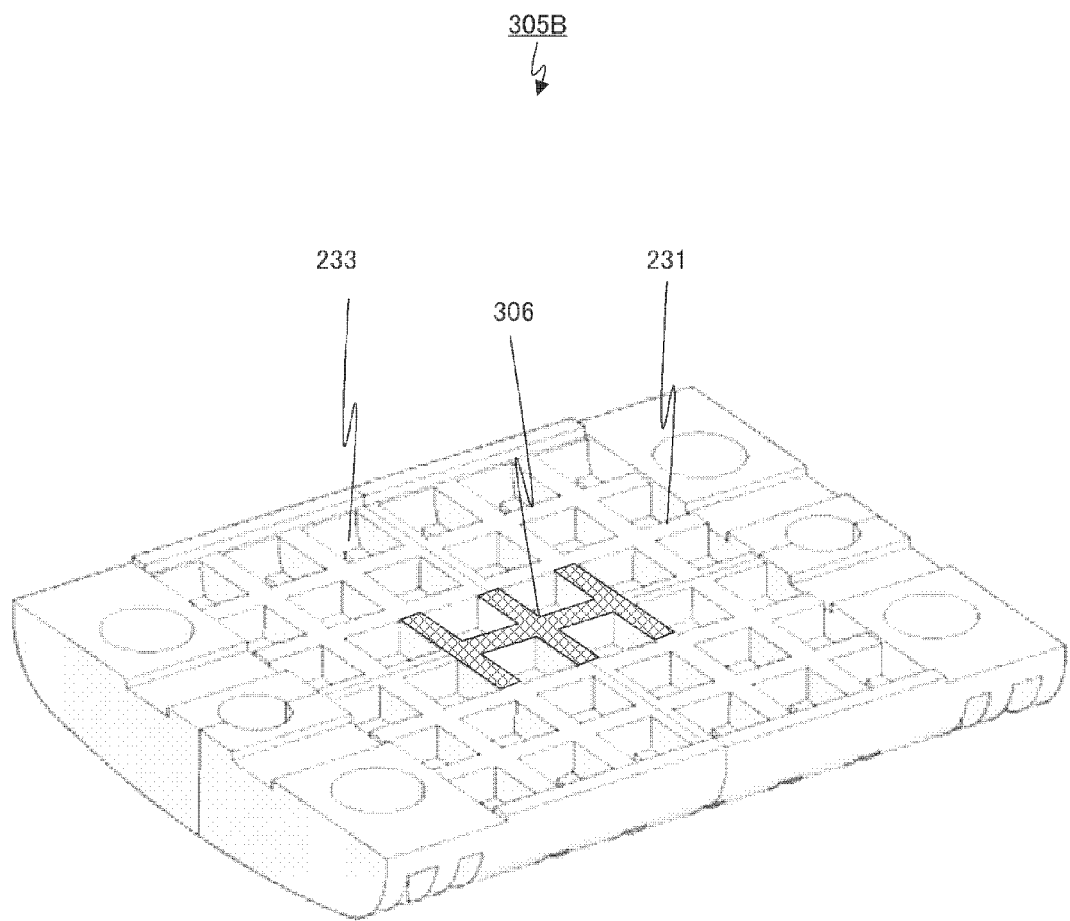
FIG. 14 is a perspective view of an end plate according to Embodiment 3 as seen from the collector plate side.

FIG. 14 is a perspective view of end plate 305B of Embodiment 3 as seen from the collector plate side-surface. As illustrated in FIG. 14, end plate 305B includes region 306 which includes protrusions emanating from convexed portions 231 (hereinafter also referred to "protrusion region 306"). Herein, "protrusion" means a protrusion formed on the top surface of convexed portion 231 of end plate 305B.

Figure 15A:
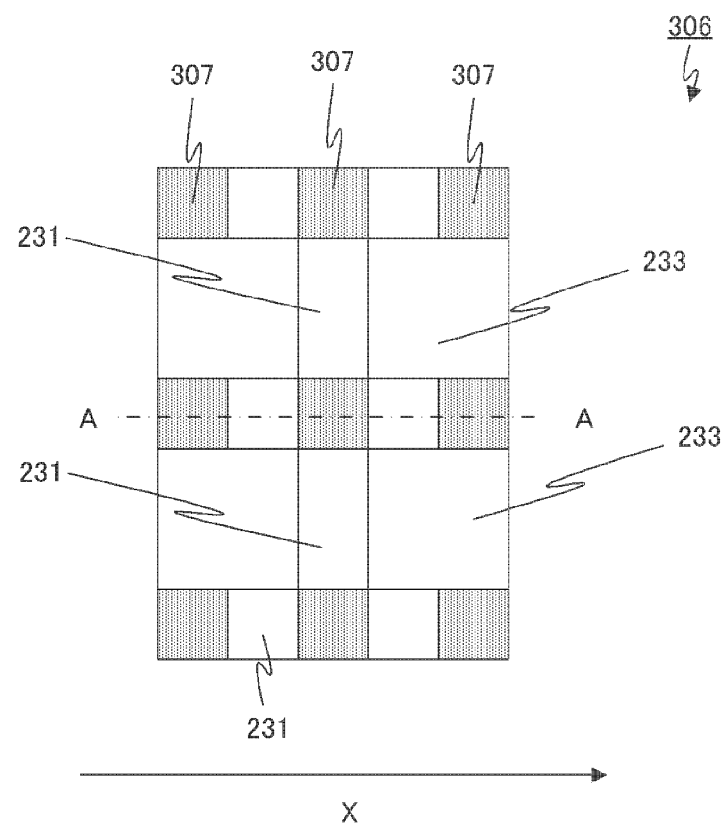
FIGS. 15A and 15B are enlarged front views of a protrusion region.
Figure 15B:
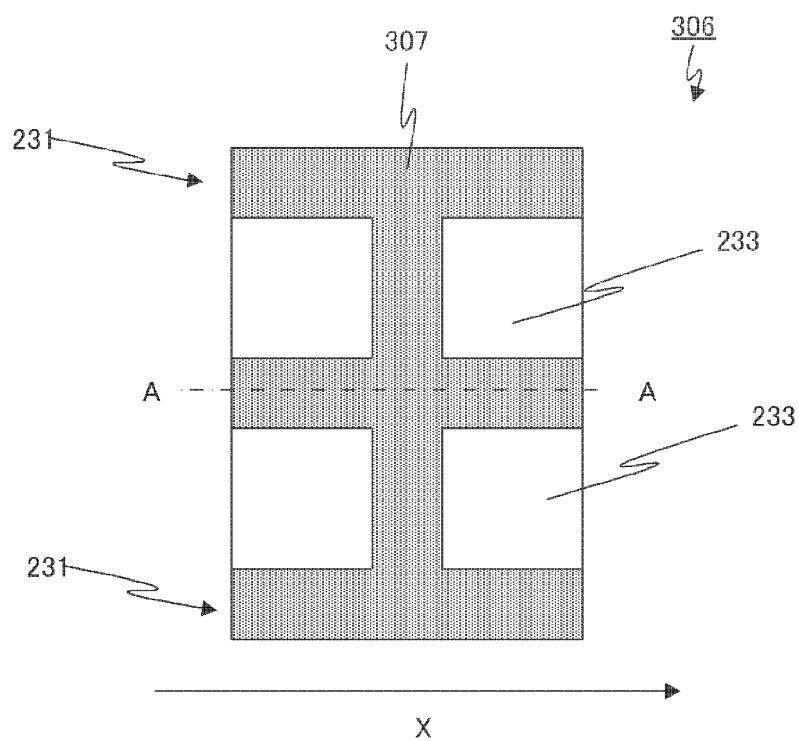

FIGS. 15A and 15B are enlarged plan views of protrusion region 306. As illustrated in FIGS. 15A and 15B, protrusion region 306 includes protrusions 307, which are preferably 0.05-0.15 mm in height. Protrusion region 306 may include a plurality of protrusions as illustrated FIG. 15A, or may include only one protrusion 307 as illustrated in FIG. 15B. When only one protrusion 307 is provided in protrusion region 306 as illustrated in FIG. 15B, convexed portions 231 in protrusion region 306 themselves are made larger in height than convexed portions 231 not provided in protrusion region 306. Protrusion region 306 preferably has a major axis and a minor axis. The minor axis of protrusion region 306 preferably runs along the ring band circumferential direction X.

Figure 16A:
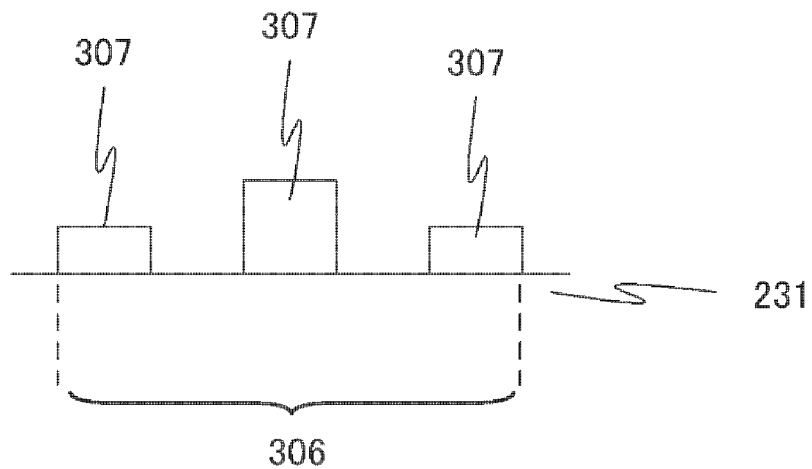
FIGS. 16A and 16B are cross sectional views of protrusions.
Figure 16B:
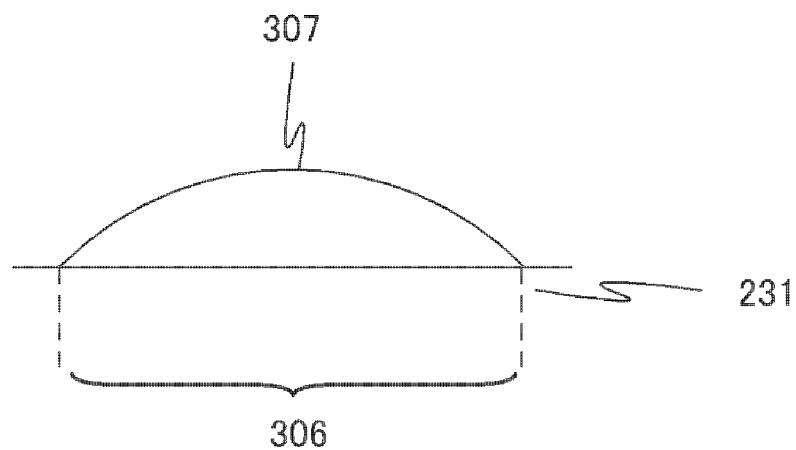

FIG. 16A is a cross-sectional view, cut along dashed-dotted line A-A, of protrusion region 306 of FIG. 15A. As illustrated in FIG. 16A, protrusion 307 positioned at the center is preferably higher than those positioned at the periphery of protrusion region 306. FIG. 16B is a cross-sectional view, cut along dashed dotted line A-A, of protrusion region 306 of FIG. 15B. When protrusion region 306 has only one protrusion as illustrated in FIG. 16B, protrusion 307 is convexly curved, and the height preferably becomes maximum at the center of protrusion region 306. In this way center protrusion 307 is preferably higher than those positioned at the periphery of protrusion region 306.

Figure 17A:
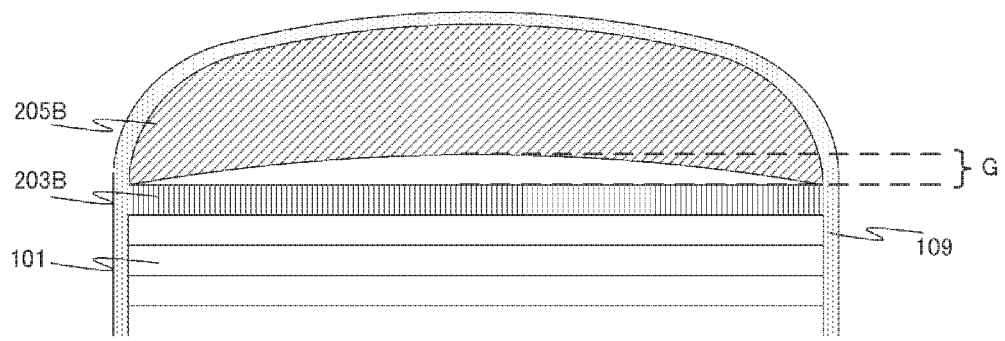
FIGS. 17A and 17B are partially enlarged cross-sectional views of a fuel cell stack.
Figure 17B:
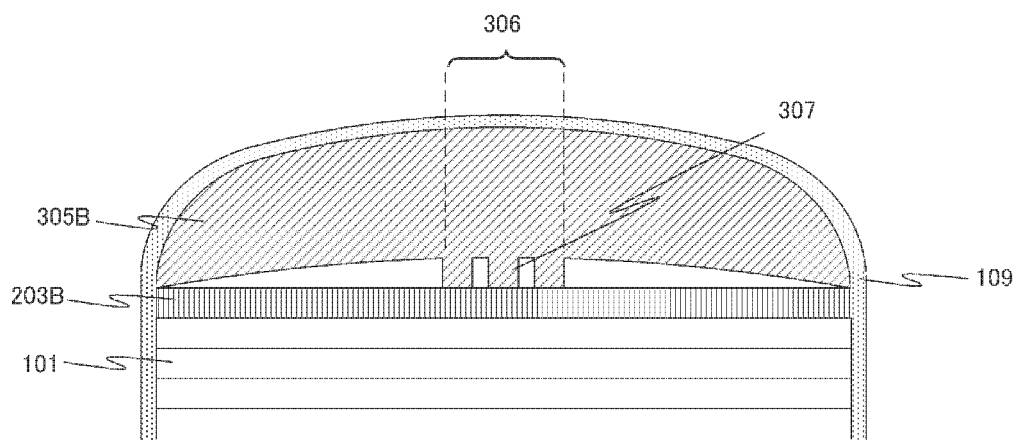

With reference to FIGS. 17A and 17B, the effect of protrusion region 306 will be described below. End plate 205B of the fuel cell stack illustrated in FIG. 17A does not include protrusion region 306, whereas end plate 305B of the fuel cell stack illustrated in FIG. 17B includes protrusion region 306.

When ring band 109 is used to secure cell assembly 101, collector plate 203B and end plate 205B as illustrated in FIG. 17A, there is a case where the end plate is deformed so that gap G is formed between end plate 205B and collector plate 203B. In such a case, end plate 205B with no protrusion region 306 cannot apply load to the center of collector plate 203B, resulting in failure to apply uniform load to cell assembly 101.

By contrast, when end plate 305B includes protrusion region 306 as in this embodiment, it is possible to conduct load to the center of collector plate 203B by protrusion 307 of protrusion region 306 even when end plate 305B is deformed. Thus, even when the end plate is deformed, uniform load can be applied to cell assembly 101.

As illustrated in FIGS. 17A and 17B, gap G formed by deformation of the end plate becomes largest in size near the center of the collector plate. Thus, by arranging protrusion region 306 on the center of the collector plate side-surface of end plate 305 and by making the center protrusion 307 higher than those positioned at the periphery of protrusion region 306 as described above (see FIGS. 16A and 16B), protrusion region 306 which contacts collector plate 203B becomes flatter when the end plate is deformed, whereby more uniform load can be applied to the cell assembly.

Gap G that forms by the deformation of the end plate typically has a major axis and a minor axis, with the minor axis running along the ring band circumferential direction. By providing protrusion region 306 so that the minor axis runs along ring band circumferential direction X (see FIGS. 15A and 15B), the surface of the end plate which contacts collector plate 203B becomes flatter when the end plate is deformed, making it possible to apply more uniform load to the cell assembly.

According to this embodiment, it is thus possible to apply uniform load to the cell assembly even when the end plate is deformed.

The present application claims the priority of Japanese Patent Application No. 2009-064152 filed on Mar. 17, 2009, the entire contents of which are herein incorporated by reference.

INDUSTRIAL APPLICABILITY

A fuel cell stack according to the present invention discharges less heat to the outside. Thus, the fuel cell stack is useful as a fuel cell stack used in household co-generation systems.

EXPLANATION OF REFERENCE NUMERALS 100, 200: fuel cell stack
101: cell assembly
102: region where a collector plate and an end plate face each other
103, 203: collector plate
105, 205, 305: end plate
107: elastic member
108: stack consisting of cell assembly, collector plates and end plates
109: ring band
111: oxidizing gas supply port
113: coolant supply port
115: fuel gas supply port
117: fuel gas discharge port
119: coolant discharge port
121: oxidizing gas discharge port
131, 231: Convexed portion on the collector plate side-surface of an end plate
133, 233: Concaved portion on the collector plate side-surface of an end plate
141, 241: Convexed portion on the ring band side-surface of an end plate
143, 243: Concaved portion on the ring band side-surface of an end plate
151: Convexed portion on the ground side of an end plate
135: second convexed portion
137: second concaved portion
153: concaved portion on a collector plate
155: third convexed portion
157: third concaved portion
306: Protrusion region
307: Protrusion

The invention claimed is:

1. A fuel cell stack comprising:
a cell assembly formed of a stacked unit cells, each composed of a membrane electrolyte assembly and separators which sandwich the membrane electrolyte assembly;
a pair of collector plates A and B which sandwiches the cell assembly;
a pair of end plates A and B which sandwiches the cell assembly and the collector plates; and
an elastic member disposed between end plate A and collector plate A,
wherein end plate A has a convexed portion and a concaved portion on a surface facing collector plate A, and
the concaved portion of end plate A holds therein the elastic member,
a bottom surface of the concaved portion includes a second convexed portion and a second concaved portion so that a part of a surface of the elastic member facing end plate A does not contact with the end plate A, and
the elastic member contacts with a second convexed portion of the end plate A.

2. The fuel cell stack according to claim 1, wherein
collector plate A includes a concaved portion for holding therein the elastic member,
a bottom surface of the concaved portion of collector plate A includes a third convexed portion and a third concaved portion, and
the elastic member contacts a top surface of the third convexed portion.

3. The fuel cell stack according to claim 1, wherein the elastic member is a coil spring.

4. The fuel cell stack according to claim 1, wherein end plate B includes a convexed portion and a concaved portion on a surface which faces collector plate B.

5. The fuel cell stack according to claim 4, further comprising another elastic member disposed between end plate B and collector plate B, wherein
the concaved portion of end plate B holds therein the another elastic member,
a bottom surface of the concaved portion includes a second convexed portion and a second concaved portion so that a part of the surface of the elastic member does not contact with end plate B, the surface of the elastic member facing end plate B, and
the elastic member contacts with the second convexed portion of the end plate B.

6. The fuel cell stack according to claim 4, wherein
no elastic member is disposed between end plate B and collector plate B,
a surface of end plate B which faces collector plate B is a contact surface with respect to collector plate B, and
a top surface of the convexed portion of end plate B contacts collector plate B.

7. The fuel cell stack according to claim 6, wherein the total area of the top surface of the convexed portion of end plate B which contacts collector plate B is 10-30% of the area of a region where end plate B and collector plate B face each other.

8. The fuel cell stack according to claim 6, wherein the convexed portion on the surface of end plate B which faces collector plate B includes a rib forming a lattice.

9. The fuel cell stack according to claim 1, further comprising a ring band which is wrapped around the cell assembly, the pair of collector plates and the pair of end plates for securing, wherein
a surface of the end plate which faces the ring band includes a convexed portion and a concaved portion, and
the ring band and a top surface of the convexed portion of the end plate contact each other.

10. The fuel cell stack according to claim 9, wherein a surface of the end plate which faces the collector plate includes a convexed portion and a concaved portion, the convexed portion includes a rib running along the ring band circumferential direction.

11. The fuel cell stack according to claim 9, wherein the convexed portion on the surface of the end plate which faces the ring band includes a rib running along the ring band circumferential direction.

12. The fuel cell stack according to claim 9, wherein
the surface of the end plate which faces the ring band is a convex semi-cylindrical surface having generatrices being perpendicular to the ring band circumferential direction,
the convex semi-cylindrical surface includes generatrix Y farthest from the collector plate among the generatrices, and generatrix Z constituting an edge of the convex semi-cylindrical surface among the generatrices,
the convex semi-cylindrical surface is composed of a central region including generatrix Y and side regions including generatrix Z which sandwich the central region, and
the curvature radius of the central region is larger than the curvature radii of the side regions.

13. The fuel cell stack according to claim 12, wherein the ratio of the area of the side region which contacts the ring band to the total area of the side region is larger than the ratio of the area of the central region which contacts the ring band to the total area of the central region.

14. The fuel cell stack according to claim 1, wherein the end plates are made of resin.

* * * * *